No. 772,216. PATENTED OCT. 11, 1904.
J. CHISHOLM.
MUSIC BOARD.
APPLICATION FILED MAR. 4, 1904.
NO MODEL.
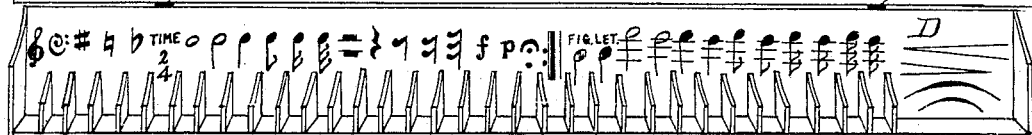
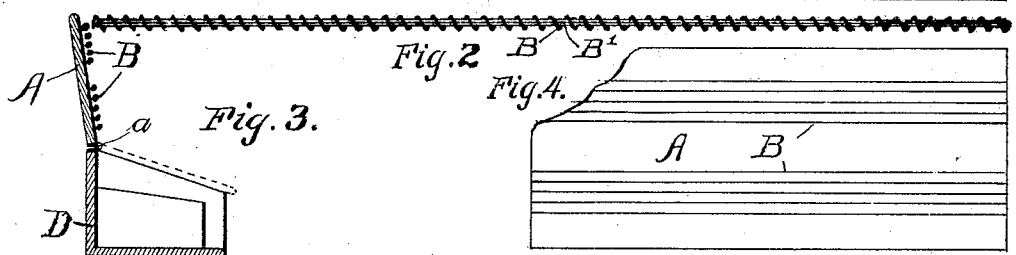
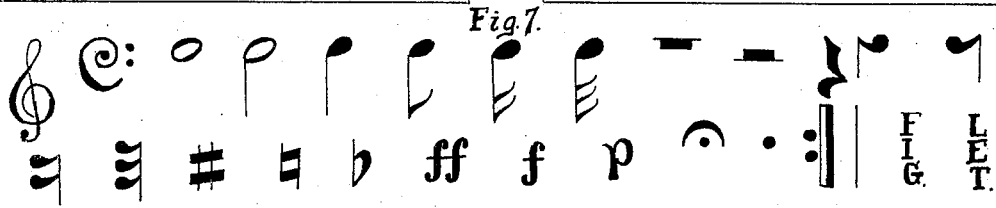
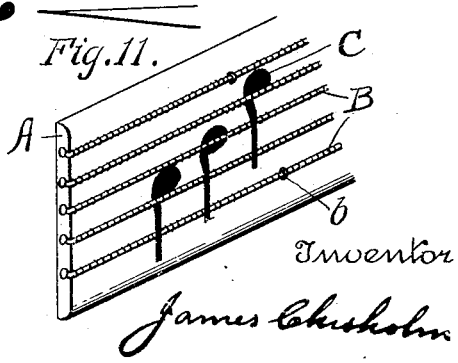
Witnesses
E. B. Brown
W. L. Adams
Inventor
James Chisholm No. 772,216.                                                                                              Patented October 11, 1904.

UNITED STATES PATENT OFFICE.

JAMES CHISHOLM, OF AUSTIN, PENNSYLVANIA.

MUSIC-BOARD.

SPECIFICATION forming part of Letters Patent No. 772,216, dated October 11, 1904.

Application filed March 4, 1904. Serial No. 196,623. (No model.)

*To all whom it may concern:*

Be it known that I, JAMES CHISHOLM, a citizen of the United States, residing at Austin, in the county of Potter and State of Pennsylvania, have invented certain new and useful Improvements in Music-Charts, of which the following is a specification.

The object of my invention is to provide an improved chart for teaching music to children and beginners in a simple and practical way.

In carrying out my invention I use a board the front surface of which is painted white, and to this board I attach a number of spiral springs arranged in parallel lines to represent the staff. Preferably both the treble and bass staves are indicated on the board in this manner. The notes, signs, &c., are preferably made of cardboard, leather-board, or the like, colored black, and are adapted to be held in proper position on the board by means of the stretched spiral springs. In this way a series of notes, signs, &c., may be placed in position on the staff very quickly and easily and may as quickly and easily be removed therefrom when desired. The board is made slightly convex on its front face, so that the springs may fit it more closely, and if the board is very large or wide the springs may be attached to the board not only at their opposite ends, but also intermediate these ends. In connection with the board I employ a cabinet consisting of a series of compartments to hold the detachable notes, signs, rests, &c. Each compartment is properly marked to indicate the kind of notes, signs, &c., it contains. The staffboard may be hinged to the cabinet and closed down over it, if desired.

Other features of the invention will be hereinafter more particularly described.

In the accompanying drawings, Figure 1 is a perspective view of the improved music board or chart and cabinet. Fig. 2 is a view, on enlarged scale, of one of the spiral springs used to make a staff. Fig. 3 shows a transverse section of the board and cabinet shown in Fig. 1. Fig. 4 is a front view of the board with the staff-wires attached, a part of the board being broken away. This figure, however, only shows the staff-wires diagrammatically. Fig. 5 is a plan view of the board with the staff-wires and with some of the signs and notes held in position by the staff spring-wires, a part of the board being broken away. Fig. 6 is a similar view with additional notes applied, a part of the board being broken away. Fig. 7 shows the several detachable signs, notes, rests, &c. Fig. 8 shows a series of notes with ledger-lines thereon. Fig. 9 is a top view of the board, showing the manner in which it is curved. Fig. 10 is an enlarged view of one of the detachable notes. Fig. 11 is a detail view, on an enlarged scale, of a part of the board and a part of one of the staves made up of the spring-wires.

The board A may be of any suitable size. It is white on its front face and is preferably slightly convex, as shown in Fig. 9. Across this board are stretched spiral springs B. These springs are made of steel wire, and the convolutions are drawn apart, as indicated in Fig. 2. Preferably each of the springs is threaded with covered elastic B', colored black, and the springs are preferably covered with black enamel, so that they may indicate black lines on the white board. The ends of the springs may be attached to the board by any suitable attaching devices, and if the board is very long the springs may be attached to the board at intermediate points, as shown at $b$ in Fig. 11. The notes C may be made of leather-board, cardboard, or other suitable material. One of these notes is indicated on an enlarged scale in Fig. 10. These notes, signs, &c., are contained in compartments in a cabinet D, to which the board A is hinged at $a$. The several compartments are properly marked to indicate the notes they contain. Fig. 4 indicates the appearance of the board before any notes are set up. In order to place notes in the staff, it is only necessary to take them from the compartments in the cabinet D and insert their upper ends below the springs B in the manner indicated in Fig. 11. The notes will be held securely in the position to which they may be set by these springs and will then appear as in Fig. 5 or Fig. 6 or as shown more elaborately in Fig. 1. I use springs for forming the staff because I find that cord or similar material does not have sufficient holding power to hold a series of notes side by side. The springs exert pressure on the notes, which securely holds them against the board and prevents their slipping. I find also that where the springs have the coils or convolutions separated, as indicated in Fig. 2, better results are obtained because greater friction is produced than where the convolutions are close together, which is apt to make the surface of the springs smoother. A music-chart made in this way with detachable notes can be very conveniently used to teach music to beginners, and the use of chalk, crayons, &c., is avoided, and the objectionable dust incident to their use is done away with. Another advantage gained by my improvements is that the notes are all properly shaped, and hence the music may always be properly indicated, whereas if the instructor or pupil attempts to make the notes with chalk, &c., there is liability of error.

I claim as my invention—

1. The combination of a board, a series of wire springs stretched thereon and attached thereto in parallel lines to indicate a music-staff, and notes adapted to be detachably connected with the wires and board.

2. The combination of a board, of springs having open or separated coils or convolutions and which are stretched across the board and attached thereto in parallel lines to indicate a music-staff, and notes adapted to be detachably connected with said springs and board.

3. The combination of a board, wire springs having open convolutions and threaded with black elastic, and devices for attaching the springs and elastic in parallel lines to the board to represent a music-staff.

4. The combination with a board having a white convex front face, of wire springs having open convolutions and attached to the board in parallel lines to indicate a music-staff, and black elastic threaded through the springs and notes adapted to be detachably connected with the board and springs.

5. The combination of a board, a series of wire springs arranged thereon and attached thereto in parallel lines to indicate a music-staff, notes adapted to be detachably connected with the wires and board, and a cabinet below the board having a series of receptacles provided with suitable designations for holding the detachable notes.

In testimony whereof I have signed my name to this specification in the presence of two subscribing witnesses.

JAMES CHISHOLM.

Witnesses:
 S. J. WEBSTER,
 C. S. BARROWS.